(12) United States Patent
Gozdawa

(10) Patent No.: US 6,623,164 B1
(45) Date of Patent: Sep. 23, 2003

(54) HYDRODYNAMIC JOURNAL BEARING

(75) Inventor: Richard Julius Gozdawa, Hillingdon (GB)

(73) Assignee: Corac Group PLC (GB)

( * ) Notice: Subject to any disclaimer, the term of this patent is extended or adjusted under 35 U.S.C. 154(b) by 0 days.

(21) Appl. No.: 09/762,997

(22) PCT Filed: Aug. 19, 1999

(86) PCT No.: PCT/GB99/02748

§ 371 (c)(1),
(2), (4) Date: Mar. 26, 2001

(87) PCT Pub. No.: WO00/11360

PCT Pub. Date: Mar. 2, 2000

(30) Foreign Application Priority Data

Aug. 19, 1998 (GB) ............................................. 9818098

(51) Int. Cl.⁷ ............................................... F16C 32/06
(52) U.S. Cl. ....................................... 384/117; 384/119
(58) Field of Search ........................ 384/117, 99, 114, 384/119, 122, 134, 309

(56) References Cited

U.S. PATENT DOCUMENTS

| | | |
|---|---|---|
| 3,791,703 A | 2/1974 | Ifield |
| 3,985,405 A | 10/1976 | Okano et al. |
| 3,988,046 A | 10/1976 | Okano |
| 3,994,367 A | 11/1976 | Christ |
| 4,627,746 A | 12/1986 | Grisel et al. |
| 4,704,879 A | 11/1987 | Christ et al. |
| 5,360,273 A | 11/1994 | Buckmann |
| 5,743,657 A | 4/1998 | O'Reilly et al. |

FOREIGN PATENT DOCUMENTS

| | | |
|---|---|---|
| FR | 1.538.467 | 7/1968 |
| FR | 2 507 265 | 12/1982 |

*Primary Examiner*—Pam Rodriguez
(74) *Attorney, Agent, or Firm*—Harness, Dickey & Pierce, P.L.C.

(57) ABSTRACT

A tilting pad journal bearing (2) comprises a bearing shell (4) having a substantially cylindrical inner surface and at least three bearing pads (5, 6, 7) extending around the inner surface of the bearing shell in a substantially circumferential direction. Each of the pads (5, 6, 7) is arranged for pivotal movement relative to the bearing shell (4) by a substantially spherically-extending surface (8, 9, 10) on the pad engaging a mating substantially spherically-extending surface (11, 12, 13) associated with the bearing shell. At least one of the substantially spherically-extending surfaces (11) associated with the shell (4) is provided on a member (14) so mounted in or on the bearing shell as to be capable of radial movement relative to the shell and a spring is provided for urging the member radially inwards.

15 Claims, 2 Drawing Sheets

Section A-A

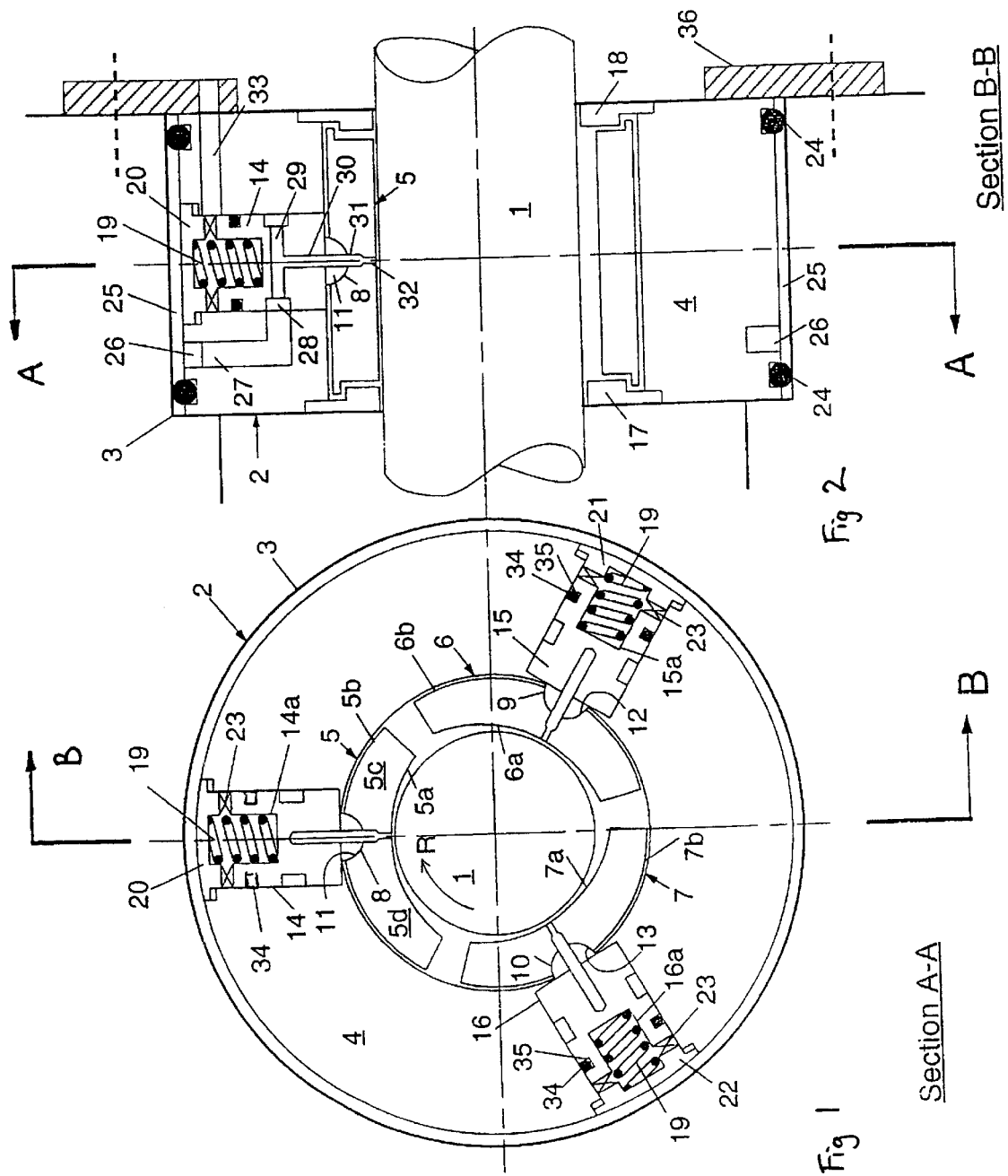

HYDRODYNAMIC JOURNAL BEARING

BACKGROUND OF THE INVENTION

The invention relates to bearings, and more especially to tilting pad journal bearings.

It is well known in the art that in some instances rotors run unstably in simple journal bearings of circular bore, especially when the loading of the bearings is only a relatively small fraction of their load capacity. In many bearing applications, more elaborate forms of journal bearing are used to promote stability in operation. One such form of bearing for a journal is a tilting pad journal bearing, which generally comprises three or more pads located around the journal within a rigid bearing shell. The inwardly-facing surfaces of the pads conform approximately to the outer surface of the journal, and the pads are so arranged that they can pivot relative to the rigid bearing shell and align themselves with the journal, in operation. The design of the bearing may be such that, as the journal rotates, lubricating fluid present in the shell is drawn between the journal and the pads. Above a threshold rate of rotation, a continuous film of lubricant is formed which prevents solid to solid contact between the pads and the journal. Such an arrangement is referred to in the art as being "self-generating".

SUMMARY OF THE INVENTION

The invention provides a tilting pad journal bearing comprising a bearing shell having a substantially cylindrical inner surface and at least three bearing pads extending around the inner surface of the bearing shell in a substantially circumferential direction, each of the pads being arranged for pivotal movement relative to the bearing shell by means of a substantially spherically-extending surface on the pad engaging a mating substantially spherically-extending surface associated with the bearing shell, the bearing being a self-generating bearing in which gas films between the pads and a journal are self-generated in use when the journal is rotated above a threshold rate, wherein at least one of the said substantially spherically-extending surfaces associated with the shell is provided on a member so mounted in or on the bearing shell as to be capable of radial movement relative to the shell and wherein the bearing further comprises spring means for urging the said member radially inwardly and gas supply means for supplying pressurized gas to the interface between the journal and the pad associated with the said member to create in use a separating film aerostatically at said interface to urge the said member radially outwardly, said spring means and said gas supply means being arranged in use to separate the pad associated with the said member from the journal when the journal is stationary and at least up to said threshold rate of journal rotation.

The expression "spherically-extending surface" is used in this specification to mean a surface that is at least a part of the outer surface of a sphere or at least a part of the inner surface of a hollow sphere.

The or each of the substantially spherically-extending pivot surfaces on the pads may be concave surfaces, the mating surfaces associated with the bearing shell being convex surfaces. Alternatively, the or each of the pads may be provided with convex pivot surfaces, the mating surfaces associated with the bearing shell being concave.

With the arrangement of the invention, means are provided for supplying high pressure gas to the interface between the bearing pads and a journal supported by the bearing, in use. Such a supply urges the bearing pads radially outwardly.

With previously proposed arrangements of tilting pad journal bearings that are self-generating, a film of lubricating fluid between a journal and its bearing formed by the rotation of the journal is able to produce separating forces sufficient to hold the pads firmly in position above a certain rotational speed of the journal. When operation is initiated and at low rotational speeds, however, and especially in arrangements in which the lubricating fluid is a gas, the or each pad not supporting the weight of the journal is not held steady, and may be prone to flutter.

With the arrangement of the invention, one or more radially-movable members mounted in or on the bearing shell and urged radially inwards can be provided to engage the or each pad that might otherwise be prone to flutter at low rotational speeds, so that the or each of the said pads is, in turn, urged radially inwards. This radially inward urging acts in opposition to the radially outward urging of the high pressure gas supplied to the interface between the bearing pads and the journal. These oppositely directed urgings act to steady said pad or pads that might otherwise be prone to flutter. In addition, the radially outward urging is greater than the radially inward so that, before rotation is initiated and at least up to the threshold speed at which "self-generation" occurs, a separating film of gas is created aerostatically to separate said pad or pads from the journal to provide protection of the co-operating surfaces of said pad or pads and the journal at low rates of rotation and before adequate self-generation arises.

The bearing of the invention can operate, even initially, with substantially constant loading of all of its pads. This provides improved control of the journal, and flutter of one or more of the pads can be inhibited.

In operation, rotors are subject to synchronous vibration caused by unbalance of the rotor, such vibration being referred to as "forced vibration". In some instances, a rotor is also subject to non-synchronous vibration at a frequency related to a natural frequency of the rotor, and that vibration can be excited by an input of energy at a bearing or bearings. That kind of vibration is referred to as "self-excited vibration". The arrangement of the invention can help to moderate the tendency towards self-excited vibration by maintaining substantially uniform loading of the pads of the bearing at all stages of operation.

Advantageously, the number of pads that is provided with radially-movable members and means for urging the members radially inwards is at least that number required for each pad to be held positively when the journal is stationary. Preferably, at least the or each pad not arranged to bear the weight of the journal when the journal is stationary is provided with such means. By way of example, when a bearing has three equally-spaced pads of equal length it is sufficient for one pad to be provided with a radially-movable member if the other two pads are positively located by the weight of the journal, but in the case where there are four equally spaced pads of equal length, then two or more of the pads should generally each be provided with a radially-movable member depending on whether the axis of the rotor is horizontal or vertical, and, if the axis is horizontal, on whether the weight of the rotor is shared equally by two pads, or is taken principally by one of them.

The bearing of the present invention can be so arranged that, in operation, as the speed of rotation of the journal is increased, separating forces exerted by self-generated fluid films between the journal and the pads rise sufficiently to overcome substantially constant pad loading exerted by the or each radially-movable member, and the or each radially-movable member moves further radially outwards. This will, of course, depend upon several factors including the force urging the members inwards, and the weight of the pads themselves. Advantageously, there is provided means for limiting radial movement of the or each of the said members relative to the bearing shell in an outward direction beyond a limiting position. With such an arrangement, when the or each of the said members reaches its limiting position, further retraction is prevented and the bearing can then act as a bearing in which all the pads have pivots that are at fixed positions relative to the bearing shell.

The arrangement of the invention is applicable to bearings that operate with liquid or gas as their lubricant, but is especially advantageous in a bearing that is lubricated with gas, for example, air, in operation.

If the speed of rotation of a rotor coincides with a natural frequency of vibration of the rotor in its bearings, it is said that the rotor is running at a "critical speed". It is desirable to avoid that, but with a variable speed machine, it is not always possible. In designing a rotor system including its bearings, in order to avoid the normal running speed or speeds of the rotor being critical speeds, it is first necessary to determine the critical speeds, which depend upon the characteristics of the bearings. As the speed of rotation of a rotor is increased through its threshold speed at which self-generated films are created to its desired operating speed, it may have to pass through one or more critical speeds. By maintaining the supply of high pressure gas to the interface between the bearing pads and the journal even after reaching the threshold speed and as the rotor passes through its critical speed or speeds, as is possible with the arrangement of the invention, increased stability can be given to the rotor during its acceleration to its full operating speed.

When the bearing is provided with means for supplying high pressure gas to the interface between the bearing pads and the journal as referred to above, the arrangement is preferably such that the high pressure gas is supplied to the said interface by passing substantially diametrically through the said mating substantially spherically-extending surfaces of the pivots. The said means for supplying high pressure gas preferably comprises a passageway extending through the or each radially-movable member and a passageway extending through each bearing pad. A flow resistance, which may be an orifice of restricted cross-sectional area, may be provided in the passageways either upstream or downstream of the substantially spherically-extending surfaces of the pivots. The gas pressure downstream of such a flow resistance will rise when the gap between the pad and its journal diminishes, and the film of gas between the journal and the pad then exerts a restoring force on the pad.

Advantageously, the or each of the said radially-movable members comprises a piston which is arranged as a sliding fit in a radially-extending bore in the bearing shell. Preferably, for ease of manufacture, each of the pads of the bearing is associated with a piston mounted in a radially-extending bore in the bearing shell. In such an arrangement, each of the substantially spherically-extending pivot surfaces associated with the bearing shell is advantageously formed on an inwardly facing surface of one of the pistons. Advantageously, the means for urging each of the said radially-movable members inwards comprises a compression spring.

The invention also provides a rotor system comprising a rotor having a journal and a tilting pad journal bearing in accordance with the invention.

The invention further provides a compressor including a rotor in two or more bearings, at least one of which is a tilting pad journal bearing in accordance with the invention.

BRIEF DESCRIPTION OF THE DRAWINGS

A tilting pad journal bearing constructed in accordance with the invention will now be described by way of example with reference to the accompanying drawings, in which:

FIGS. 1 and 2 are each diagrammatic sections of the bearing of the invention, in use, FIG. 1 being a tranverse section taken along a line A—A of FIG. 2, and FIG. 2 being a diagrammatic longitudinal section of the bearing of FIG. 1 taken along the line B—B;

DETAILED DESCRIPTION OF THE PREFERRED EMBODIMENT

Figure 3:
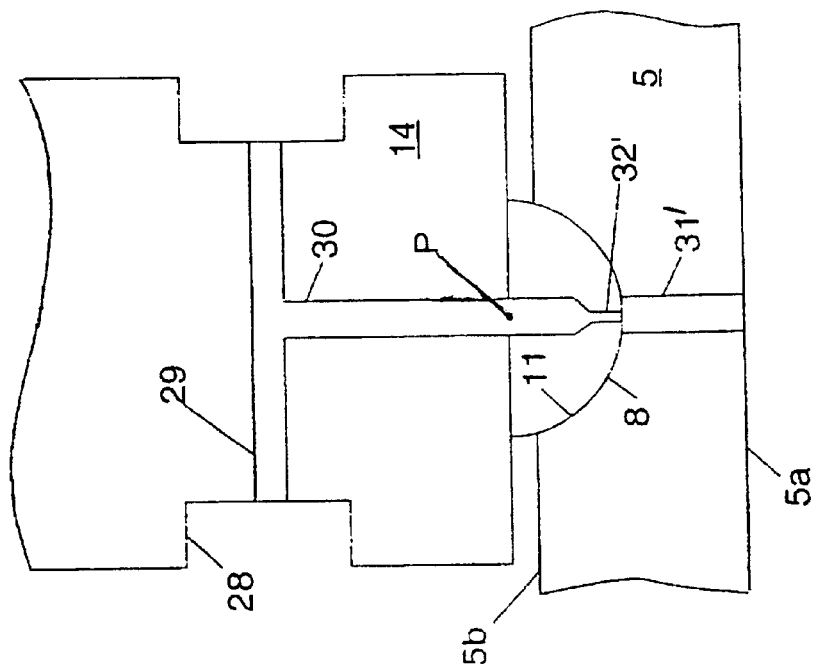
FIG. 3 is a detail of the bearing of FIG. 1 on a larger scale.

Referring to the accompanying drawings, a rotor having a journal 1 is mounted for rotation (in a direction indicated by an arrow R) in a bearing, indicated generally by the reference numeral 2, located in a machine frame 3. The bearing 2 is a gas-lubricated bearing employing air as lubricant, but other gases can be used as the lubricant instead, if desired. The bearing 2 comprises a cylindrical bearing shell 4 and three bearing pads indicated generally by the reference numerals 5, 6 and 7, respectively, extending around the inner surfaces of the bearing shell 4 in a circumferential direction. Each of the pads 5, 6 and 7 has an inwardly-facing curved surface 5a, 6a and 7a, respectively, and an outwardly-facing curved surface 5b, 6b and 7b, respectively.

The outwardly-facing surface 5b, 6b and 7b of each pad has a centre of curvature that lies on the axis of the bearing shell 4, and has a radius of curvature only slightly less than that of the inner surface of the bearing shell. The inwardly-facing surface 5a, 6a and 7a of each pad has a radius of curvature slightly greater (of the order of 0.1%) than the radius of the journal 1.

Each of the outwardly-facing curved surfaces 5b, 6b and 7b of the pads is formed with a spherically-extending concave pivot surface 8, 9 and 10, respectively, which surfaces engage mating convex pivot surfaces 11, 12 and 13, respectively, projecting inwardly and centrally from end faces of radially-extending pistons 14, 15 and 16, respectively, mounted in bores in the bearing shell 4. As described in more detail below, the pistons 14, 15 and 16 are precision sliding fits in their respective bores, but only the piston 14 is allowed to move within its bore in use, the other pistons 15 and 16 being positively located within their bores in use.

As the pads 5, 6 and 7 are identical, only the pad 5 will be described in further detail, but it should be understood that the description also applies to the other two pads 6 and 7. As is shown diagrammatically in FIGS. 1, 2 and 3, the mating spherically-extending pivot surfaces 8 and 11 allow the pad 5 to pivot about the point P, (see FIG. 3) at the centre of curvature of the mating pivot surfaces. The point P is offset from the centre of the outwardly-facing surface 5b of the pad in the same sense as the sense of rotation of the journal (clockwise as shown in FIG. 1). Trailing portion 5c of the pad 5 is shorter in a circumferential direction than leading portion 5d, and the leading portion is thinned towards its edge so that the pad is statically and inertially balanced about the point P. When the pad 5 is held against its pivot, as is shown in FIG. 1, it can be seen that there is a small clearance (which is shown as uniform in FIG. 1 but need not be uniform) between the outwardly-facing surface 5b of the pad and the inner cylindrical surface of the bearing shell 4.

The radius of curvature of the inwardly-facing surfaces 5a, 6a and 7a of the pads relative to that of the journal 1, and the relation between the pivot point P and the leading and trailing edges of the inwardly-facing surface of each pad are fundamental in determining performance characteristics of the bearing 2. The difference between the diameter of the greatest circle that can be inscribed within the inwardly-facing surfaces 5a, 6a and 7a of the pads and the diameter of the journal 1 itself is referred to as the "diameter of the clearance circle of the bearing". The difference between the diameter of curvature of the inwardly-facing surfaces 5a, 6a and 7a of the pads and the diameter of the journal 1 expressed as a fraction of the diameter of the clearance circle of the bearing is referred to as the "pre-load" of the bearing.

It will be understood that the clearances between the outwardly-facing surfaces 5b, 6b and 7b of the pads and the bearing shell 4, the clearances between the inwardly-facing surfaces 5a, 6a and 7a of the pads and the journal 1, the curvatures of the pads 5, 6 and 7, and the thinning of the pads are all shown exaggerated in the drawings for the purpose of clarity.

Loosely-fitting keeper rings 17 and 18, respectively, are provided to retain the pads 5, 6 and 7 within the bearing shell 4. The rings 17 and 18 are secured to the bearing shell 4 by screws (not shown) positioned in the faces of the bearing shell at angular positions away from the bores for the pistons 14, 15 and 16.

Referring again to the pistons 14, 15 and 16, which are all made the same for ease of manufacture and assembly, each of the pistons is formed with a central bore 14a, 15a and 16a, respectively, which contains a compression spring 19. The bores 14a, 15a and 16a are closed at their outer ends by means of buttons 20, 21 and 22, respectively, which are, for example vacuum brazed to the bearing shell 4, or otherwise secured. Annular shims 23 are provided between the buttons 20, 21 and 22 and the outwardly-facing end surfaces of their respective pistons 14, 15 and 16 to limit radially-outwards movement of the pistons within their respective bores. The pistons 15 and 16 are positively located against their shims 23 under the weight of the rotor resting on the pads 9 and 10. The piston 14 can, however, move with a relatively short stroke within its bore 14a, that movement being radial with respect to the bearing shell 4. The piston 14, under the action of its compression spring 19, urges its convex pivot surface 11 against the mating concave pivot surface of the pad 5, and in turn acts to urge the pad 5 towards the journal 1. Outward radial movement of the piston 14 against the action of the spring 19 is limited by the shims 23 and the button 20.

The bearing 2 is mounted in the machine frame 3 by means of two O-rings 24 which extend around the bearing and seal an annular region 25 between the bearing shell 4 and the machine frame from the outside. A circumferential channel 26 around the outside of the bearing 2 in the outer surface of the bearing shell 4 allows communication between the annular region 25 and three drillings 27 in the bearing shell 4, one drilling being provided for each of the pistons 14, 15 and 16, but only the drilling for the piston 14 being shown (see FIG. 2). Each of the drillings 27 in turn communicates with a waist 28 formed around the outside of the respective piston 14, 15 and 16. Each of the pistons 14, 15 and 16 has a cross-drilling 29 which connects the waist 28 with an axial drilling 30 extending along the piston to its convex pivot surface 11, 12 and 13, respectively. Each of the axial drillings 30 is aligned with a drilling 31 in its mating concave pivot surface 8, 9 and 10, respectively, and its respective pad 5, 6 and 7, each of the drillings 31 communicating with the interface between the pads and the journal 1 through an orifice 32 of reduced cross-sectional area. The interior of the annular region 25 can be connected to a high pressure air receiver (not shown) typically at a pressure of 8 bars.

A further drilling 33 in the bearing shell 4 connects the region between the outwardly-facing ends of each of the pistons 14, 15 and 16 and the inwardly-facing surfaces of their respective buttons 20, 21 and 22 with atmospheric pressure or low ambient pressure within the machine frame 3.

Entry of high pressure gas into the pistons 14, 15 and 16 via the waists 28, together with the establishment of atmospheric or ambient pressure at the outwardly-facing ends of the pistons ensures that any resultant pressure force in an axial direction along the pistons is insignificant.

Each of the pistons 14, 15 and 16 is also formed with an external groove 34 which serves in the case of the piston 14 as a precaution against a phenomenon similar to that of hydraulic lock experienced with gases. In the cases of the pistons 15 and 16, which are maintained against their shims 23, the grooves 34 serve simply for holding O-rings 35. A keeper 36 is provided to retain the bearing 2 axially in its bore in the machine frame 3. The bearing 2 is retained with a small clearance between it and the machine frame 3 so that it is free to move radially within the elastic and damping constraints of the O-rings 24. The bearing 2 is prevented from rotation with the journal 1 by a pin (not shown) extending from the right hand surface of the bearing in FIG. 2 and a slot (not shown) in the keeper 36 with which it engages loosely.

The bearing 2 can be assembled by firstly closing the bearing shell 4 by inserting the buttons 20, 21 and 22, and then pushing the pistons 14, 15 and 16 into their bores from within the shell. The pistons 14, 15 and 16 are firstly assembled in the shell 4 with trial shims 23, but without the springs 19. For adjustment purposes, a platen-mounted stub journal is inserted into the bearing 2 and is arranged to rest on the pads 6 and 7. The pads 6 and 7 are then inspected for concentricity of the stub journal with respect to the bearing shell 4, and the setting of the pad 5 is inspected with respect to bearing clearance. The stub journal and the pistons 14, 15 and 16 are then removed, and the pistons are reassembled with their compression springs 19 and with shims 23 changed to thicknesses determined from the trial inspections. The shims 23 for the pistons 15 and 16 are of such a thickness that the pistons 15 and 16 are held against the shims by the weight of the rotor and are thereby prevented from moving radially within their bores in the bearing shell 4. The piston 14 is free to move radially, however, and is urged radially inwards by its associated spring 19, the shim 23 in that case determining the limiting position of the piston 14 as it moves radially outwards.

In operation, with the journal 1 in position as shown in FIGS. 1 and 2, the pads 6 and 7 are positively located between the journal 1 and their pistons 15 and 16, respectively, under the weight of the journal 1, which bears on the pads 6 and 7. The pad 5 is also positively located being urged inwardly against the journal 1 under the action of the spring 19 of the piston 14. Before initiating rotation, high pressure air is introduced from the receiver to the annular region 25 around the bearing shell 4 and from there is delivered via the drillings 27 to the waists 28 of the pistons 14, 15 and 16. From the waists 28 the air flows along the drillings 29 and 30 in each of the pistons 14, 15 and 16 through the mating pivot surfaces 8, 11; 9, 12; and 10, 13, respectively, into the drillings 31 in the pads 5, 6 and 7 and is introduced through the orifices 32 into the interfaces between the pads 5, 6 and 7 and the journal 1. Air gaps are formed aerostatically between the journal 1 and the inwardly-facing surfaces 6a and 7a of the pads 6, 7, causing the journal 1 to be lifted from contact with the surfaces 6a, 7a. An air gap is also formed aerostatically between the journal 1 and the inwardly-facing surface 5a of the pad 5. To do this, the pad 5 is lifted relative to the shaft, pushing the piston 14 back against the radially inward urging of its associated spring 19. The establishment of these aerostatic gaps can be checked readily because the rotor in two such bearings 2 will then turn freely by hand.

Rotation of the rotor is then initiated and the speed of rotation gradually increased. During this period, the pad 5 is being continually urged by the piston 14 under the action of its compression spring 19 towards the journal 1 and flutter of the pad is thereby inhibited. As the rotor rotates, it draws with it a film of air between the journal and the pads 5, 6 and 7, respectively, and the bearing 2 becomes self-generating. When the speed of rotation has risen to a level such that substantial self-generation obtains, separating forces exerted by the self-generated fluid films between the journal 1 and the pad 5 rise to further overcome the loading of the pad and moves the piston 14 further radially outwards against the action of its spring 19. Outward radial movement of the piston 14 is however limited by the outwardly-facing end surface of the piston 14 bearing against the shims 23. Further retraction of the piston 14, and hence the position of the pivot provided by the pivot surfaces 8 and 11, is prevented and the bearing 2 then acts as a bearing in which all the pads 5, 6 and 7 pivot about points that are fixed relative to the bearing shell 4. The pads 5, 6 and 7 are free to pivot relative to the bearing shell 4 under the action of restoring forces exerted by the self-generated air films to maintain alignment of the pads with the journal 1. When this stage is reached, connection of the annular region 25 to the air receiver can be interrupted to conserve high pressure gas. Alternatively, air flow from the receiver via the annular region 25 along the pistons 14, 15 and 16 can be maintained at least until the full operating speed of the rotor is reached in order to increase stability at critical speeds of the rotor, and even thereafter in order to inject cool gas into the bearing 2, and thereby lower its temperature.

The compression springs 19 are of a stiffness determined taking into account the desired thickness of the air films to be created between the journal 1 and the pads 5, 6 and 7, the preload of the bearing 2 and the clearances between the inwardly-facing surfaces 5a, 6a and 7a of the pads and the journal.

A clearance between the outer surface of a bearing shell 2 and the machine frame 3, together with the bearing 2 being supported substantially concentrically within the clearance by the O-rings 24, allows some movement of the bearing shell within its bore. That movement is constrained by the O-rings 24, which act as damped springs. As springs, the O-rings 24 have an influence upon critical speeds of rotation, and thereby provide a means for making an adjustment of those speeds, but the O-rings also absorb energy irreversibly on deformation, and thereby make a contribution to damping vibrations of the journal 1.

Figure 4:
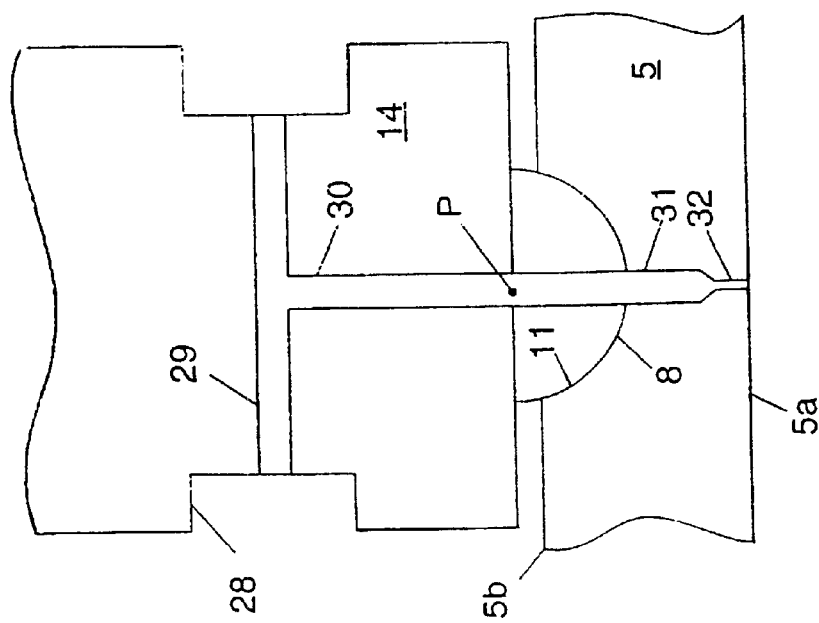
FIG. 4 is a modification of the detail of FIG. 3.

FIG. 4 is a similar arrangement to that shown in FIG. 3 with the same reference numerals being used to indicate the same features, but the arrangement shown in FIG. 4 has a drilling 31' of constant diameter through the pad 5 and an orifice 32' in the drilling 30 upstream of the spherically-extending pivot surfaces 8 and 11. The advantage of having the orifice upstream of the pivot surfaces 8 and 11 as opposed to downstream as shown in FIG. 3 is that the pressure difference across the mating pivot surfaces is reduced, enabling a reduction in leakage, and also enabling a reduction in the pressure force acting between the mating pivot surfaces which tends to their separation. Such a design of the bearing 2 can ensure that the pressure forces tending to separate the pads 5, 6 and 7 and the journal 1 caused by the air flow through the pistons 14, 15 and 16 into the interfaces between the pads and the journal are considerably greater than any possible pressure force tending to separate the mating pivot surfaces. On the other hand, it should be taken into consideration that the presence of elastic gas in the volume of the drilling 31' may so lag in its instantaneous response to a vibration in the gap between the pad 5 and the journal 1, that the pad suffers self-excited vibration.

The rotor 1 and the bearing 2 may, for example, be that of a compressor.

What is claimed is:

1. A tilting pad journal bearing comprising
a bearing shell having a substantially cylindrical inner surface and at least three bearing pads extending around the inner surface of the bearing shell in a substantially circumferential direction, each of the pads being arranged for pivotal movement relative to the bearing shell about at least two mutually orthogonal axes by means of a single substantially spherically-extending surface on the pad engaging a complementary substantially spherically-extending surface associated with the bearing shell, the bearing being a self-generating bearing in which gas films between the pads and a journal are self-generated in use when the journal is rotated above a threshold rate, wherein at least one of the said substantially spherically-extending surfaces associated with the shell is provided on a member so mounted in or on the bearing shell as to be capable of radial movement relative to the shell and wherein the bearing further comprises a spring for resiliently urging the said member radially inwardly and a gas supply for supplying pressurized gas to the interface between the journal and the pad associated with the said member to create in use a separating film aerostatically at said interface to urge the said member radially outwardly, the spring and the gas supply being arranged in use to separate the pad associated with the said member from the journal when the journal is stationary and at least up to said threshold rate of journal rotation.

2. A bearing as claimed in claim 1, wherein the or each of the substantially spherically-extending surfaces on the pads is a concave surface, the mating surfaces associated with the bearing shell being convex surfaces.

3. A bearing as claimed in claim 1, wherein the or each of the pads is provided with a convex pivot surface, the mating surfaces associated with the bearing shell being concave.

4. A bearing as claimed in claim 1, wherein the number of pads that is provided with radially-movable members and spring means for urging the members radially inwards is at least that number required for each pad to be held positively when the journal is stationary.

5. A bearing as claimed in claim 1, wherein there is provided means for limiting radial movement of the or each of the said radially-movable member relative to the bearing shell in an outward direction beyond a limiting position.

6. A bearing as claimed in claim 1, wherein the gas supply means further includes a passageway extending through the or each radially-movable member.

7. A bearing as claimed in claim 6, wherein a flow resistance, preferably an orifice of restricted cross-sectional area, is provided in the passageways upstream of the substantially spherically-extending surfaces of the pivots.

8. A bearing as claimed in claim 6, wherein a flow resistance, preferably an orifice of restricted cross-sectional area, is provided in the passageways downstream of the substantially spherically-extending surfaces of the pivots.

9. A bearing as claimed in claim 1, wherein the or each of the said radially-movable members comprises a piston which is arranged as a sliding fit in a radially-extending bore in the bearing shell.

10. A bearing as claimed in claim 1, wherein each of the pads of the bearing is associated with a piston mounted in a radially-extending bore in the bearing shell and each of the substantially spherically-extending pivot surfaces associated with the bearing shell is formed on an inwardly-facing surface of one of the pistons.

11. A bearing as claimed in claim 1, wherein each of said pads is statically balanced about its said pivot point.

12. A bearing as claimed in claim 11, wherein each of said pads is also inertially balanced about its said pivot point.

13. A rotor system comprising a rotor having a journal and a tilting pad journal bearing as claimed in claim 1.

14. A compressor including a rotor in two or more bearings of which at least one bearing is a tilting pad journal as claimed in claim 1.

15. A tilting pad journal bearing comprising a bearing shell having a substantially cylindrical inner surface and at least three bearing pads extending around the inner surface of the bearing shell in a substantially circumferential direction, each of the pads being arranged for pivotal movement relative to the bearing shell in a plurality of different directions by means of a single substantially spherically-extending surface on the pad engaging a complementary substantially spherically-extending surface associated with the bearing shell, the bearing being a self-generating bearing in which gas films between the pads and a journal are self-generated in use when the journal is rotated above a threshold rate, wherein at least one of the said substantially spherically-extending surfaces associated with the shell is provided on a member so mounted in or on the bearing shell as to be capable of radial movement relative to the shell and wherein the bearing further comprises a biasing member resiliently urging the said member radially inwardly and a gas supply for supplying pressurized gas to the interface between the journal and the pad associated with the said member to create in use a separating film aerostatically at said interface to urge the said member radially outwardly, the biasing member and the gas supply being arranged in use to separate the pad associated with the said member from the journal when the journal is stationary and at least up to said threshold rate of journal rotation.

* * * * *

UNITED STATES PATENT AND TRADEMARK OFFICE
CERTIFICATE OF CORRECTION

PATENT NO. : 6,623,164 B1
DATED : September 23, 2003
INVENTOR(S) : Richard Julius Gozdawa It is certified that error appears in the above-identified patent and that said Letters Patent is hereby corrected as shown below:

Column 4,
Line 30, "surfaces" should be -- surface --

Column 6,
Line 11, "bars" should be -- bara --

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,623,164 B1
DATED : September 23, 2003
INVENTOR(S) : Richard Julius Gozdawa It is certified that error appears in the above-identified patent and that said Letters Patent is hereby corrected as shown below:

Column 4,
Line 30, "surfaces" should be -- surface --

Column 6,
Line 11, "bars" should be -- bara --

Column 9,
Lines 6-9, "a flow resistance, preferably an orifice of restricted cross-sectional area, is provided in the passageways upstream of the substantially spherically-extending surfaces of the pivots" should be -- the gas supply means includes a passageway extending through the or each radially-movable member and a passageway extending through each bearing pad. --
Line 10, "claim 6" should be -- claim 7 --
Line 12, after "passageways", insert -- either upstream or --

Signed and Sealed this

Seventh Day of December, 2004

JON W. DUDAS
*Director of the United States Patent and Trademark Office*